United States Patent
Cashman

[15] 3,694,805
[45] Sept. 26, 1972

[54] STOLEN VEHICLE INDICATING DEVICE

[72] Inventor: Robert L. Cashman, Mineola, N.Y.
[73] Assignee: Sperry Rand Corporation
[22] Filed: July 14, 1971
[21] Appl. No.: 162,361

[52] U.S. Cl. .................. 340/64, 340/280, 200/44
[51] Int. Cl. ................................... B60r 25/10
[58] Field of Search...... 340/63, 64, 65, 280, 282, 84, 340/85, 90; 200/42, 44, 61.64, 61.67

[56] References Cited

UNITED STATES PATENTS

| 1,309,351 | 7/1919 | Centoni | 340/63 |
| 1,347,495 | 7/1920 | Campbell | 340/63 |

Primary Examiner—Alvin H. Waring
Attorney—S. C. Yeaton

[57] ABSTRACT

A vehicle ignition lock which includes a spring actuated contact for completing an electrical circuit upon removal of the ignition lock cylinder that illuminates the backup lights of the vehicle to provide an indication that the vehicle has been stolen.

7 Claims, 2 Drawing Figures

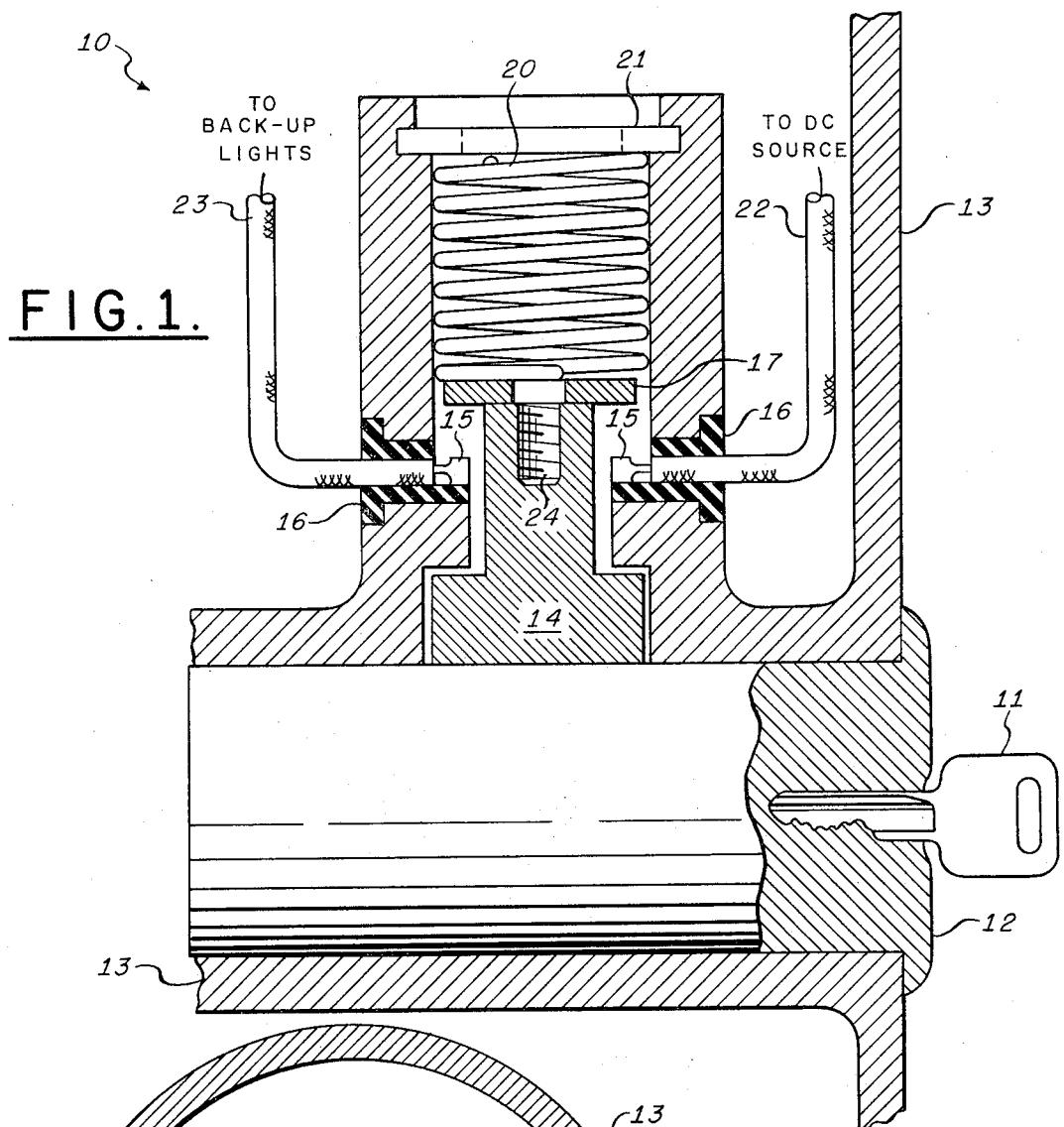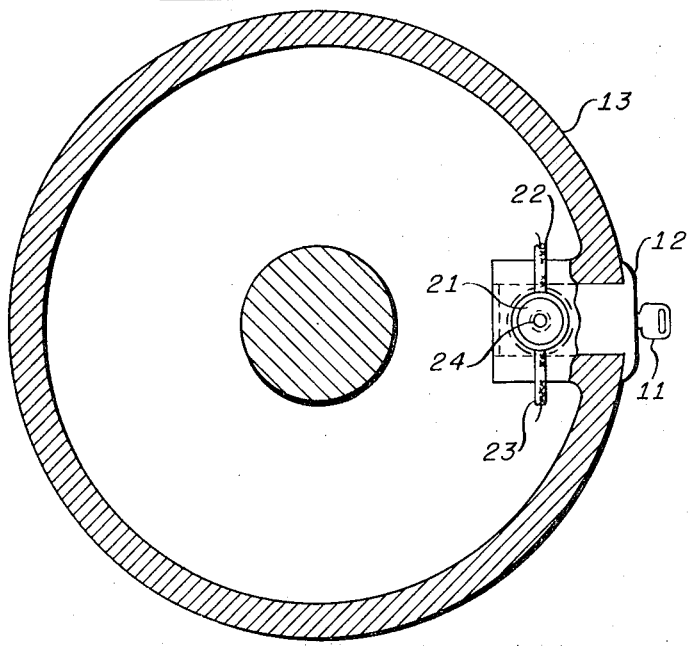

STOLEN VEHICLE INDICATING DEVICE

BACKGROUND OF THE INVENTION

1. Field of the Invention

This invention pertains to automotive vehicles and particularly to devices which provide a visual indication that the vehicle has been stolen.

2. Description of the Prior Art

Many systems and devices are known in the prior art which discourage the theft of vehicles, especially automobiles; for example, devices for preventing the starting of the vehicle engine or preventing the opening of the vehicle engine hood or storage compartment lid are all known. In addition, other devices provide an audible alarm when an attempt is made to move the vehicle in an unauthorized manner. These devices usually require extensive rewiring and/or modification to the vehicle due to additional circuit elements which results in increased cost and additional power drain.

One of the most common and simplest techniques used in stealing a vehicle is to remove its ignition lock cylinder and replace it with another ignition lock cylinder. The ignition key for the replacement cylinder is used to start the engine and complete the theft. The present invention provides a simple modification to existing ignition lock cylinders which causes the vehicle to become conspicuous by illuminating the backup lights when the ignition lock cylinder has been removed. It also provides an indication device which is extremely difficult to disable by inserting another ignition lock cylinder.

DESCRIPTION OF THE DRAWINGS

FIG. 1 is a sectional view of an ignition lock which incorporates the structure of the subject invention, and FIG. 2 is an isometric drawing of a steering wheel shaft with steering wheel removed showing the ignition lock which incorporates the subject invention mounted in place.

SUMMARY OF THE INVENTION

The subject invention is a modification to the ignition lock of a vehicle which includes a hollow housing that encloses a snap ring in its base which retains a coil spring and an annular contact ring. Also mounted within the hollow cylindrical housing are switch contacts, one of which is wired to a d.c. source such as the battery and the other to the backup lights. A plunger mounted within the housing has one end pressed against the side of the cylinder in the ignition lock and the other end in contact with the annular ring thereby maintaining the annular ring displaced from the electrical contacts. Upon removal of the cylinder lock the spring expands forcing the plunger to tumble out of the housing and presses the annular ring against the electrical contacts. The annular ring completes the circuit between the d.c. source and the backup lights thereby illuminating the backup lights and rendering the car conspicuous. When the plunger is forced out of the housing, it is necessary to remove the steering wheel to reinsert the plunger. As a result, it is extremely difficult to turn off the backup lights by installing another ignition lock cylinder.

DESCRIPTION OF THE PREFERRED EMBODIMENT

A stolen vehicle indicating device 10 is shown in FIG. 1 with an ignition key inserted in the ignition lock cylinder 12. The indicating device 10 includes a hollow cylindrical housing 13 mounted perpendicular to the cylinder lock 12. A plunger 14 is disposed withing the housing 13 and is retained in place by the side of the cylinder lock 12. Two electrical contacts 15 are mounted to the surface of a slightly necked-down portion of the housing 13 opposite the lock cylinder 12 and at diametrically opposed locations. Insulators 16 are mounted between the electrical contacts 15, the conductors 22, 23 and the housing 13 thereby inhibiting the completion of the electrical circuit through the housing 13. An annular ring 17 is disposed within the housing 13 and displaced from the electrical contact 15 by the plunger 14. A coil spring 20 has one end secured to the annular ring 17 and its other end affixed to a snap ring 21. One of the electrical contacts 15 is connected to a source of d.c. potential through a conductor 22 and the other electrical contact 15 is connected to the backup lights through a conductor 23.

The plunger 14 has a threaded opening 24 which is engaged by a threaded installing tool inserted into the plunger through the snap ring 20, the coil spring 21 and annular ring 17. The installing tool is used to draw the plunger 14 into the housing 13 while the lock cylinder 12 is being mounted in place.

In operation the lock cylinder 12 retains the plunger 14 within the housing 13 and the plunger 14 depresses the spring 20 by making contact with the annular ring 17. Upon removal of the lock cylinder 12 the spring 20 which is retained by the snap ring 21 at the end opposite the plunger 14 forces the annular ring 17 down which causes the plunger 14 to tumble out of the housing 13. There is sufficient clearance within the housing 13 to enable the plunger 14 to tumble out unimpeded. The spring 20 also forces the annular ring 17 against the electrical contacts 15 which completes the electrical circuit between the source of d.c. potential through the conductor 22 to the backup lights through the conductor 23.

In order to disable the circuit comprised of the conductors 22 and 23, the electrical contacts 15 and the annular ring 17, a plunger 14 must be reinserted into the housing 13. The available opening for the lock cylinder 12 is limited making it extremely difficult to reinsert the plunger 14 with sufficient force to depress the coil spring 20. The most efficient way to replace the plunger 14 is to remove the vehicle steering wheel exposing the shaft as shown in FIG. 2 and insert the threaded installing tool through the opening in the retaining ring 21 to engage the threaded opening 24 in the plunger 14 which is then drawn up into the housing 13 and the lock cylinder 12 is mounted in place.

The circuit comprised of conductors 22 and 23, contact 15 and the annular ring 17 can not be disengaged in the housing unless the plunger 14 or other suitable means are used to depress the spring 20 separating the annular ring 17 from the contact 15.

Tests have shown that on motor vehicles the backup lights are sufficiently brilliant in daylight to be seen under virtually all conditions of traffic. Further by incorporating the conductors 22 and 23 between the source of d.c. potential and the backup lights into the wiring harness of the vehicle, it will be more difficult to disable the indicating device once the lock cylinder 12 has been removed and the backup lights are illuminated.

While the invention has been described in its preferred embodiment, it is to be understood that the words which have been used are words of description rather than limitation and changes may be made without departing from the true scope and spirit of the invention its broader aspects.

I claim:

1. Stolen vehicle indicating device comprising,
   an ignition lock including a cylinder,
   switch means coupled to said ignition lock cylinder; and
   electrical circuit means coupled to said switch means which co-acts with said switch means upon removal of said ignition lock cylinder to provide a visible signal that implies said vehicle has been stolen.

2. Stolen vehicle indicating device as described in claim 1 in which said switch means includes a plunger that is ejected from said switch means upon removal of said ignition lock cylinder.

3. Stolen vehicle indicating device as described in claim 2 in which said switch means further includes a contactor, a spring for actuating said contactor and electrixal terminals which are connected together by said contactor upon removal of said plunger.

4. Stolen vehicle indicating device as described in claim 3 which includes a housing mounted within the steering wheel shaft of said vehicle having a hollow section for enclosing said switch means, said electrical terminals and said plunger.

5. Stolen vehicle indicating device as described in claim 4 in which said housing further encloses a snap ring for retaining said spring within said housing.

6. Stolen vehicle indicating device as described in claim 4 in which said plunger is restrained within said housing by said ignition lock cylinder.

7. Stolen vehicle indicating device as described in claim 1 in which said electrical circuit means includes a source of d.c. potential and the backup lights of said vehicle.

* * * * *